United States Patent [19]
Hughes et al.

[11] Patent Number: 5,893,074
[45] Date of Patent: Apr. 6, 1999

[54] NETWORK BASED TASK MANAGEMENT

[75] Inventors: Michael Hughes, Camarillo; Glen Gira, Nothridge; Reed Wilcox, Burbank, all of Calif.

[73] Assignee: California Institute of Technology, Pasadena, Calif.

[21] Appl. No.: 593,260

[22] Filed: Jan. 29, 1996

[51] Int. Cl.$^6$ .............................. H04B 10/20; G06F 15/73
[52] U.S. Cl. ........................ 705/8; 705/9; 705/11
[58] Field of Search .................... 705/8, 9; 364/578, 364/468.03

[56] References Cited

U.S. PATENT DOCUMENTS

| | | | |
|---|---|---|---|
| 4,875,162 | 10/1989 | Ferriter et al. | 364/468.3 |
| 4,942,527 | 7/1990 | Schumacher | 705/9 |
| 5,381,332 | 1/1995 | Wood | 705/8 |
| 5,490,097 | 2/1996 | Swenson et al. | 364/578 |
| 5,548,506 | 8/1996 | Srinivasan | 705/8 |

Primary Examiner—Kevin J. Teska
Assistant Examiner—Dan Fiul
Attorney, Agent, or Firm—Fish & Richardson P.C.

[57] ABSTRACT

An schedule-control method for managing and controlling projects is described. The method is implemented on components including an electronic user interface, relational database, and computational component. These components are designed to process input data in a well-defined format called a receivable/deliverable (rec/del) format. Using this format, the project is broken down into a series of smaller components or "tasks". Each task involves a contract between a supplier and a receiver, and results in the production of a "product". Suppliers and receivers can enter up-to-the-minute input data in the rec/del format concerning a particular product. Input data are entered through the electronic user interface which can be e-mail or a user-interface computer program. Data are entered into tables of the relational database in the rec/del format. The input data are then rapidly processed with the computational component to generate output data indicating the status of the project.

20 Claims, 9 Drawing Sheets

FIG. 6

NETWORK BASED TASK MANAGEMENT

ORIGIN OF THE INVENTION

The invention described herein was made in the performance of work under a NASA contract, and is subject to the provisions of Public Law 96-517 (35 U.S.C. §202) in which the contractor has elected to retain title.

FIELD OF THE INVENTION

This invention relates to techniques for automatically managing and controlling projects.

BACKGROUND AND SUMMARY OF THE INVENTION

Large, complex projects typically produce items such as designs, components, tests, and reports. These items are supplied by one party and received by another. Variables such as request dates, due dates, costs, and specifications are associated with each item. Each variable must be coordinated and scheduled between multiple sets of suppliers and receivers to prevent cost overruns and delays in the project's completion.

Both the variables in the project and the complexity of organizing these variables increase with the project's size. The project, in turn, becomes more difficult to manage.

Manufacturing projects for one-of-a-kind items (e.g., a NASA spacecraft) are particularly difficult to manage. These projects typically include larger numbers of supplied and received items than projects for manufacturing similar, well-established items (e.g., automobiles). A NASA spacecraft, for example, includes a large number of specialty parts which are not commercially available. These parts must therefore be fabricated in-house or sub-contracted to outside firms. Such parts often require specialized testing and detailed performance reports. This introduces more supplied and received items, and thus even more variables, into the project.

Control methods are implemented by manufacturing firms to organize and facilitate completion of the project. A standard control method features a hierarchy of managers (such as Project, Area, and Technical Managers), each of whom supervise a group of employees responsible for completion of a portion of the project. During day-to-day operations, individual employees supply, receive, and/or deliver particular items of the project; the status of each item then reported to the supervising manager. Information is then collected, tabulated, and evaluated to manage the project.

Several problems exist with conventional methods for project management. The inventor recognized that these methods lack a structured methodology for defining, recording, and processing the multiple variables that are associated with the project. Instead, information is typically communicated from employees to supervisors, and then through the management chain. Eventually, the information is somehow used to determine the project's status.

Standard project management requires the information to be communicated from one party to another. Good communication between suppliers and receivers is needed for efficient project management. The inventor recognized significant advantages from recording information directly in a centralized database. Otherwise, all employees cannot receive updated, real-time information about the status of the project. A lack of information can result in miscommunications between suppliers and receivers. These factors become even more pronounced as the size and number of the project's variables are increased.

Applicants have developed a schedule-control method for managing and controlling projects to overcome these and other limitations. The method is implemented using an electronic user interface, relational database, and computational component. Each of these components work together to process input data in a special format that is defined herein as a "receivable/deliverable" (or "rec/del") format. Using the rec/del format, the method breaks down the project into a series of smaller components, referred to herein as "tasks". Each task involves a "contract" between a supplier and a receiver. The contract results in the production of a "product". Users can enter and access up-to-the-minute input data concerning a particular product or task from the rec/del system.

The schedule-control method includes several steps for receiving, processing, analyzing, computing and sending information for monitoring the status of the project. In a first step, suppliers or receivers enter the first set of input data to the method to identify the input and output products of their particular task. The first set of input data processed by the computer upon receipt are "bids". Bids are sent by suppliers and receivers over an electronic user interface and stored in the relational database of a computer.

The electronic user interface is either e-mail or a user-interface computer program. Both of these interfaces can be implemented on conventional personal computers connected and distributed over a local-area network (LAN) or over a wide-area network such as the internet. Each supplier and receiver must have access to a computer connected and distributed over the local-area or wide-area network. The combination of these features allows users to quickly and easily supply input data and access output data.

The input data within a bid identify a particular product by: 1) naming the product; 2) associating a receiver's identification number (i.e., an account identification code) with the product; 3) associating a supplier's identification number with the product; 4) associating the receiver's required delivery date with the product; and, 5) associating the supplier's available delivery date with the product. These input data are provided for each product in the project. A contract is formed when both the supplier and receiver agree to the criteria used to define the product.

The input data within the bid are then analyzed by the computational component to determine the "state" of each product in the project. For example, the states of a product include "reconciled", "date not agreed", "product not agreed", or "no impact". If one party changes one of the criteria during the course of the project, the product's state is no longer in agreement. This change must be reviewed and accepted by the other party to complete a new contract.

Each state includes different "comments" for describing the particular product. For example, a comment such as "completed" can be entered under the "reconciled" state; a comment such as "no deliverable" can be entered under the "product not agreed" state. The comments are sent as a first set of output data to the appropriate suppliers and receivers. These users can then negotiate and update the product's state by responding with new input data. For example, work performed or further negotiation may drive the product's state from "date not agreed" to "reconciled".

The negotiating process is repeated, and work on the contract is carried out, until the state is reconciled and the product is finished. The receiver ultimately determines when the product delivery date has been successfully completed.

The status of the entire project is determined by collectively processing the various states for each individual product or task. For instance, the states can be summed together. Once determined, the actual status of the project can be packaged as a second set of output data. Data are computed to generate real-time reports so that the status of the project can be determined at any particular time. These data can be accessed via the electronic user interface by the various suppliers and receivers involved with the project.

The second set of output data can be in the form of plots, charts (e. g. GANTT charts), and reports. These data can track a particular product or the entire project. In a preferred embodiment, the second set of output data is in the form of a plot comparing the project's actual status to its predicted status. Planning and performance reports serving as metrics for identifying problem areas can also be generated. Planning reports identify products where the delivery dates conflict with those requested by the receiver, the supplier is missing, or there is no receiver. Performance reports compare the actual and planned quantities of individual products over time.

All levels of the project's suppliers and receivers—ranging from high-level Project Managers to Technical Managers to Engineers—can use the schedule-control method to control and iterate their portion of the project. Users access a timely, robust set of processed data. Suppliers and receivers can predict future time periods which may require changes in the project's structure or adjustments in the deployment of the project's resources. Ultimately, the schedule-control method facilitates successful completion of the project.

The above-described techniques have many advantages when compared to conventional organizational methods. In particular, the rec/del format facilitates efficient communication between the suppliers and receivers of a particular product. Data are supplied and received by those directly involved with a particular area of the project. Input data in the rec/del format can be modified independently without modifying the schedule of the entire project.

Distributing the control of the project over a group of users is also advantageous. Individual users can focus more resources on monitoring and controlling the flow of products within the project. Less time is spent monitoring a single product and conveying and distributing data concerning the product to supervising managers.

Distribution of control also alleviates some of the responsibilities of the project manager. Personnel dedicated exclusively to planning the project are unnecessary, as each individual user has direct control over his or her plans. In effect, the schedule-control method becomes the project's centralized control center which simultaneously facilitates decentralized decision making. This decreases the probability of cost overruns, and increases the probability that the project will be completed according to plan.

The method is particularly effective when used with large, complex, one-of-a-kind projects. Such projects typically involve large numbers of interactions between suppliers and receivers, and consequently have large degrees of uncertainty in their schedules. For example, the method can be used to effectively manage projects such as the construction of a NASA spacecraft.

BRIEF DESCRIPTION OF THE DRAWINGS

These and other aspects of the invention will now be described in detail with reference to the accompanying drawings, wherein:

FIG. 6 is a printout of a work package agreement (WPA) used in the schedule-control method;

DETAILED DESCRIPTION

The schedule-control method according to the invention effectively manages and controls large-scale, complex projects. The method is implemented using an electronic user interface, relational database, and computational component. These features are designed to process input data organized in a preferred rec/del format. This format effectively separates the project into a series of smaller tasks, each of which involves a contract between a supplier and a receiver. Each contract relates in some way to the production of a product.

Suppliers and receivers using the schedule-control method provide bids featuring a first set of input data concerning their particular task. Input data are entered into the relational database via the electronic user interface. This data may not agree, e.g., the receiver's requested delivery data may not agree with the supplier's schedule. The bids may therefore be negotiated over the electronic user interface.

A contract is established once the two parties agree to the terms of the product. The computational component is then used to analyze the input data to generate a state for each product in the project. The states are then sent across the user interface to the appropriate suppliers and receivers as a first set of output data.

Suppliers and receivers negotiate the state of each product over the electronic user interface. Negotiations cause the product's state to evolve, and continue until the product's state is reconciled by both suppliers and receivers. The states of each product can be collectively processed at any time to determine the status of the project.

A second set of output data indicating the project's status is sent across the electronic user interface to both suppliers and receivers. These data can be conveyed through a number of different representations, including, but not limited to, charts, graphs, tabulated numbers, and/or reports.

Using this method, the various suppliers and receivers in the project are able to access an accurate and timely status of each task. All suppliers and receivers have access to a dynamic representation of the project's status. Moreover, control of the project is distributed over a group of users, as opposed to being allocated to a single management person or team. Ultimately, this facilitates efficient expenditures of both time and monetary resources, and eventually successful completion of the project.

Components of the Schedule-control Method

Figure 1:
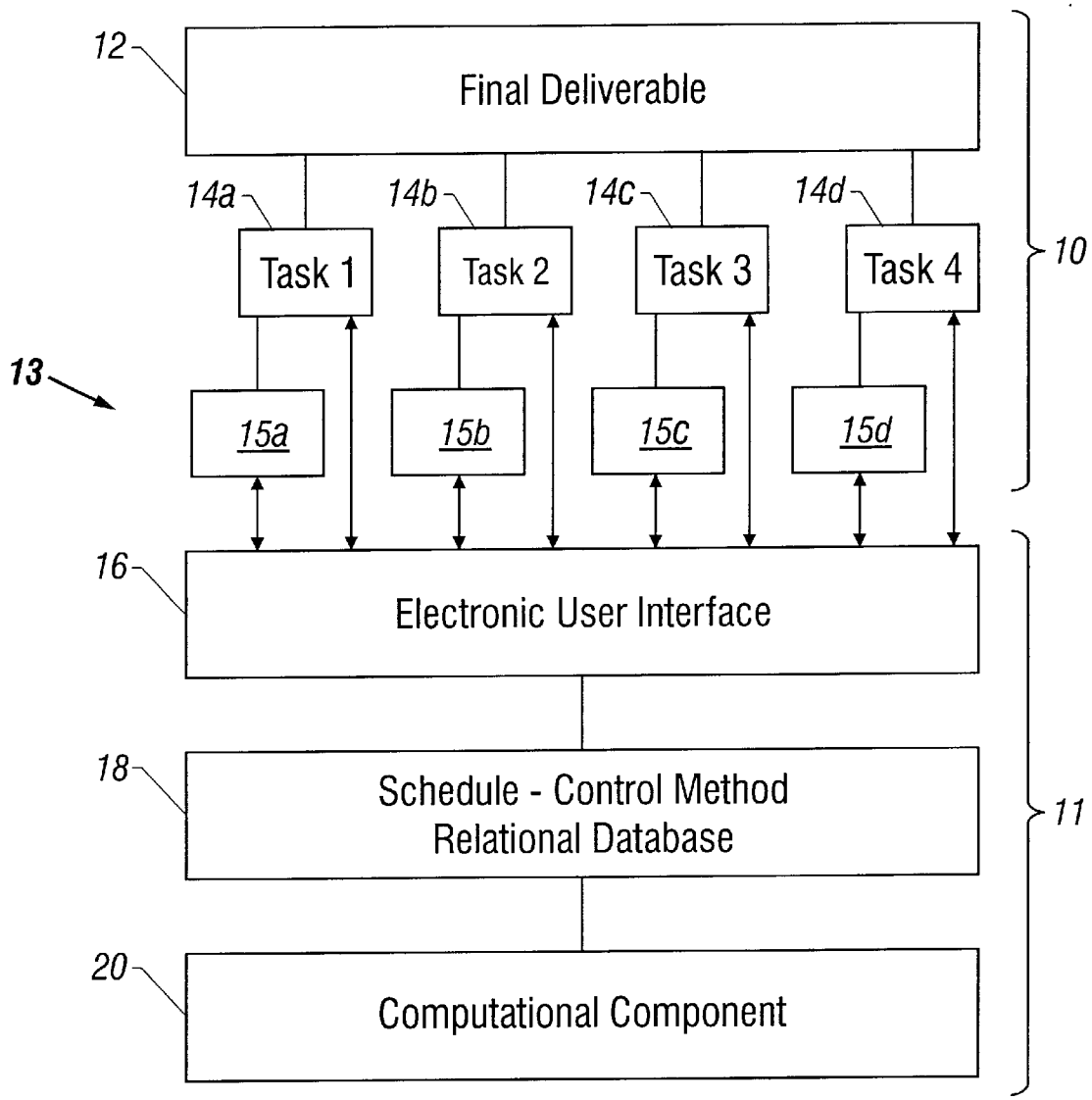
FIG. 1 is a block diagram which schematically shows a large project and the components of the schedule-control method of the invention.

FIG. 1 is a block diagram showing an exemplary project 10 to be managed and controlled using the components 11 of the schedule-control method according to the invention. The project 10 produces a final deliverable 12, such as a large scale NASA spacecraft.

The project 10 is broken down into a series of large-scale tasks 14a–14d. Each large-scale task is broken down into smaller tasks 15a–15d. Each task 14a–14d, 15a–15d results in a product. Products are designs, mechanical or electrical parts, tests, or reports. Each task is defined by a contract between at least two responsible parties, i.e., a receiver and supplier of the product.

Input data (indicated in the figure as the double-headed arrows 13) concerning the product of each task 14a–d, 15a–d in the project 10 are defined by the rec/del format. Either responsible party involved with the task can provide input data. Data are sent via an electronic user interface 16 to a schedule-control method relational database 18. The data stored in the database 18 are then analyzed with a computational component 20 to determine the contract and states for each product. The computational component 20 is a computer program written in a language which is compatible with the database 18.

Data are processed and analyzed with the computational component 20 to generate output data for the suppliers and receivers. Output data are stored in the relational database 18. These data are accessed via the electronic user interface 16 by the various suppliers and receivers involved with the project.

The electronic user interface 16, relational database 18, and computational component 20 are preferably installed on a system of computers, each connected and distributed over a LAN. Each computer on the LAN uses either e-mail or a user-interface computer program as the electronic user interface 16. E-mail is easily accessible, convenient, and available to a wide range of users. Moreover, e-mail is used to continuously supply new, up-to-date input data to the schedule-control method for processing and analysis.

Figure 2A:
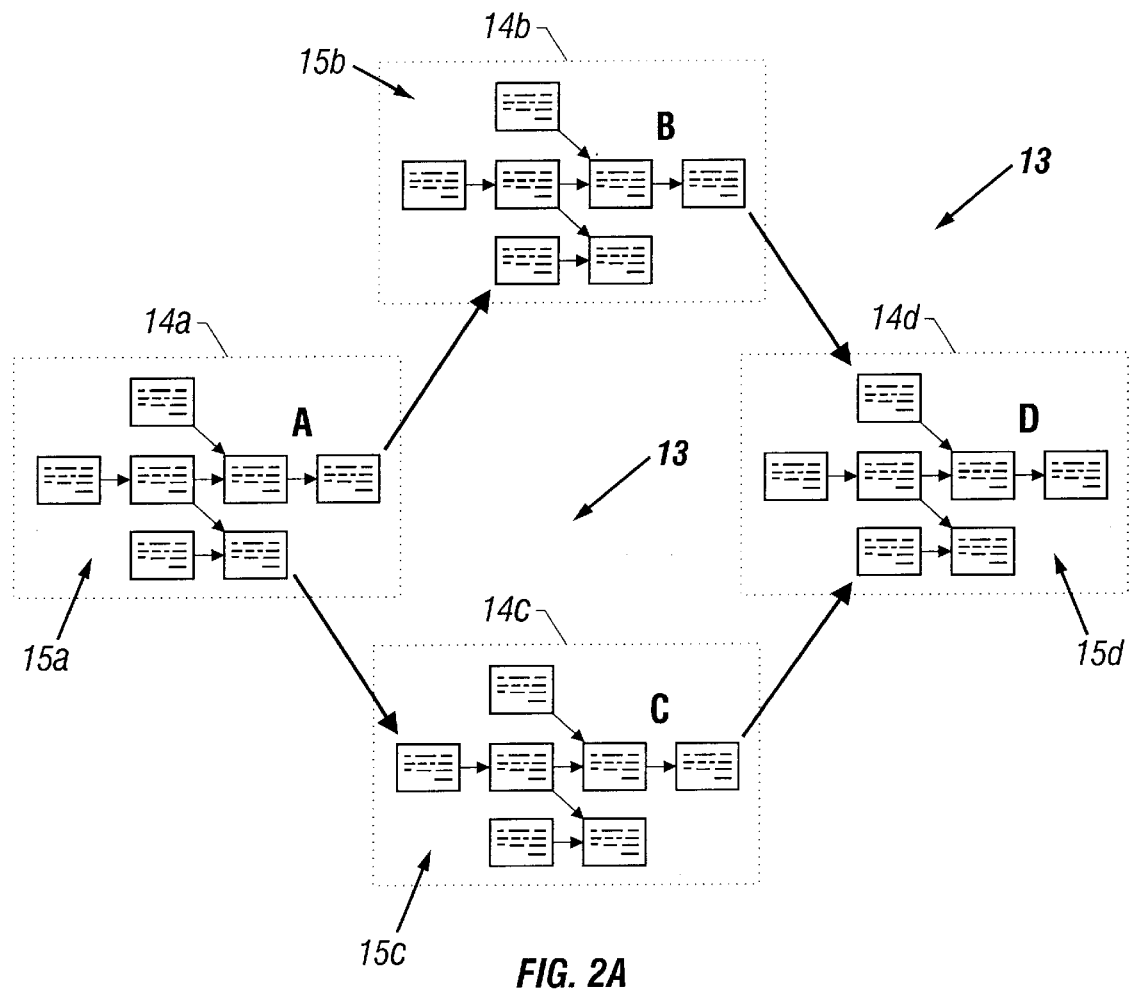
FIGS. 2A and 2B are, respectively, a schematic drawing showing how the schedule-control method is used to manage the project of FIG. 1, and a managerial hierarchy for the project.
Figure 2B:
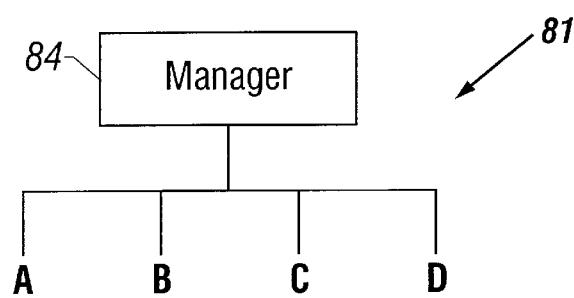

FIGS. 2A and 2B are schematic drawings showing, respectively, a schematic drawing showing how the schedule-control method is used to manage the project 10 of FIG. 1, and a managerial hierarchy 81 for the project. For example, tasks 14a–d may involve science and project engineering, instrument development, ground system development, and spacecraft system development for a large-scale project such as manufacture of a NASA spacecraft. The large-scale tasks are managed by either Technical Manager A, B, C, or D.

Technical Managers A–D act as either suppliers, receivers, or both using the schedule-control method. In the shown example, Manager A supplies a product to both Manager B and Manager C. Both Managers B and C supply a product to Manager D. A contract defining the particular product to be delivered or received is established for each of these relationships using the schedule-control method. The status of each product is dynamic, evolving as scheduling events change or work is performed on the product. FIG. 2B shows a high-level Project Manager 84 monitoring the contracts between Technical Managers A–D.

Smaller tasks 15a–d exist within each of the larger tasks 14a–d. These smaller tasks are also managed with the rec/del system. Here, contracts for products are established between each of the employees (i. e., suppliers or receivers) under a Manager's control. The status of each product in the project is negotiated and analyzed through the use of the electronic user interface, relational database, and computational component shown in FIG. 1. Each employee provides input data for their particular product and can receive status of the project at any given time. In this way, management of the project is distributed over and controlled by the project's entire work force, with each employee directly controlling his or her contract. This decreases the probability of cost overruns in the project, and increases the probability that the project will be completed according to plan.

Schedule-control Method

Figure 3A:
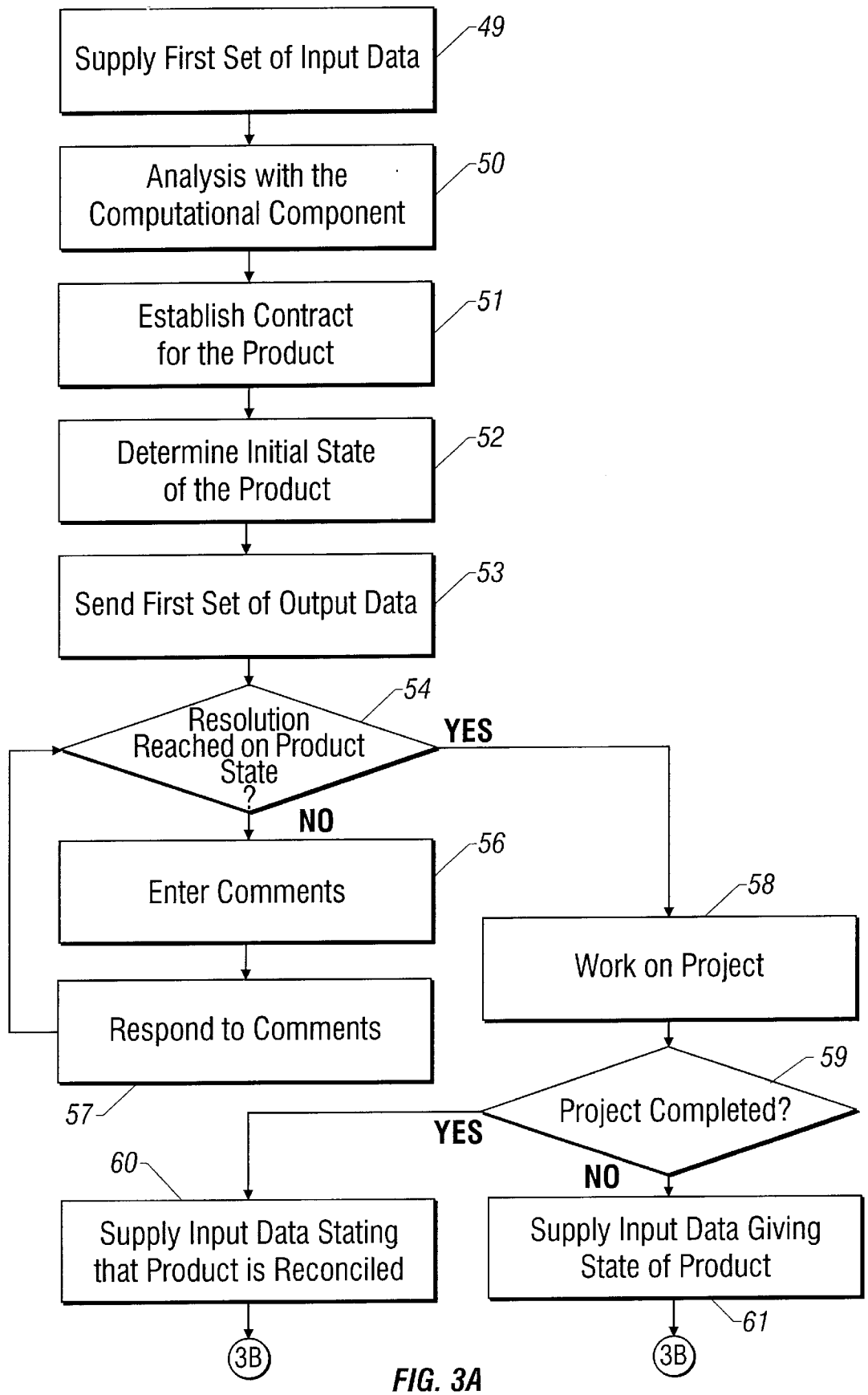
FIG. 3 is a flow chart showing the preferred steps used in the schedule-control method.
Figure 3B:
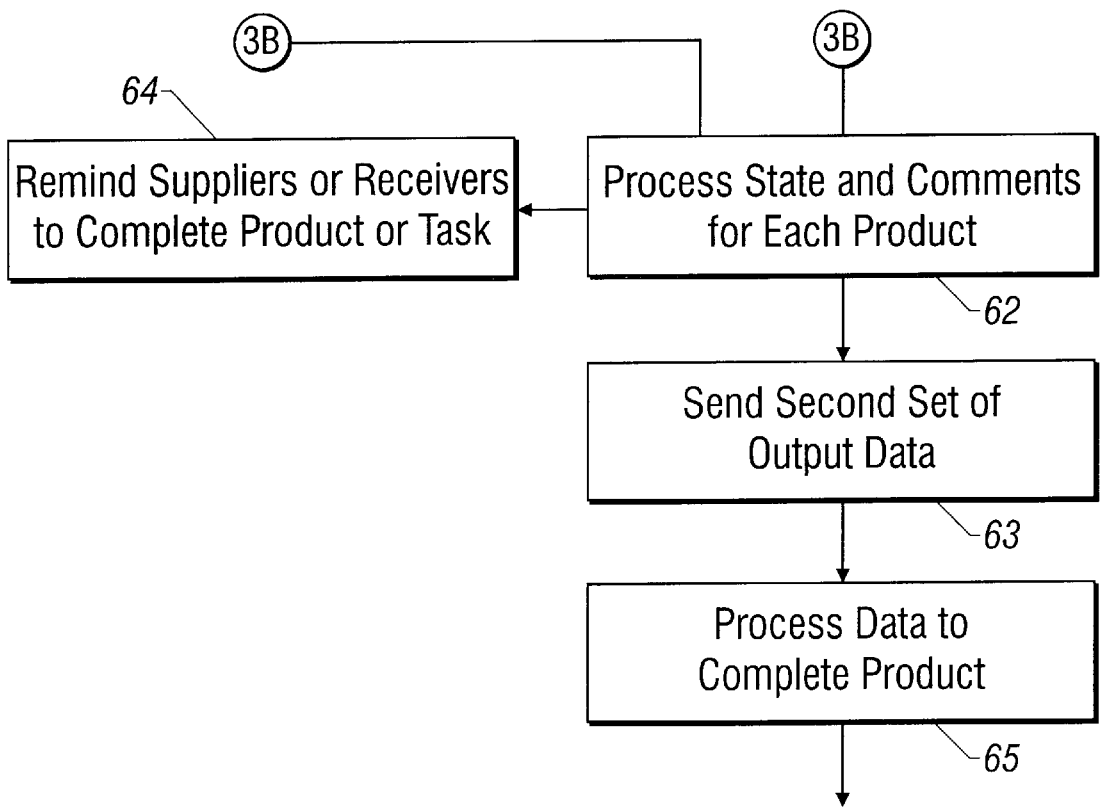

FIG. 3 shows a flowchart illustrating steps used in the schedule-control method 22. Each of the steps shown in the figure are carried out using the computational component. Input data in any appropriate rec/del format are supplied in bids by either the supplier or receiver. Data are supplied to the relational database of the system for analysis at step 49. The first set of input data identifies and defines the product. The definition of a product includes: 1) naming the product; 2) associating a receiver's identification number with the product; 3) associating a supplier's identification number with the product; 4) associating the receiver's required delivery date with the product; and, 5) associating the supplier's available delivery date with the product.

The first bid of input data is analyzed at step 50 by the computational component 20. A contract for the product is established at step 51 between the supplier and receiver only once criteria 1)–5), above, are agreed to by the supplier and receiver. The computer stores the bids of all receivers and suppliers, sorted by name. When another bid comes in, it is analyzed against the previously stored bid with that same name. Agreement of all terms yields a contract, and also establishes an initial state for the product at step 52. The initial state plus each iteration is sent by e-mail as a first set of output data to the appropriate suppliers and receivers at step 53.

One of four initial states are assigned to each product within the project. The allowable states include "reconciled", "date not agreed", "product not agreed", or "no impact". At this point the method determines if a resolution is reached on the product's state at step 54. If the "date not agreed" and "product not agreed" states result, it may be necessary to negotiate the state of the product by entering different comments which further describe the particular product (step 56). For example, a comment such as "no deliverable" can be entered under the "product not agreed" state. In this case, either the receiver or the supplier can respond to the comments by contacting the other party at step 57. This process is continued until the state of the product is resolved.

Input data are entered according to the following set of well-defined ground rules. To reduce e-mail "noise", and establish firm ownership of data relating to scheduling, suppliers and receivers only supply input data and receive output data for their particular task.

1. Only list receivables needed for delivery. Do not include comments on products or items such as schedules and implementation plans. Do not use the schedule-control method to build a documentation library or a document distribution list.
2. Lowest level of management attempts resolution. This rule recognizes that Technical Managers of the project have the responsibility and authority for deliveries in their respective area. Technical Managers have the responsibility to provide input data concerning receivables and deliverables at their level. Only if two Technical Mangers cannot work out an agreement do higher levels of management get involved.

3. Negotiations between the supplier and receiver may be started by either party.
4. The supplier has the final say on the product name even if receiver provides the input data listing the name. If the receiver inputs a new product, the supplier may change the product description since that party makes the final decision on the product's name. Receivers need to be informed when this occurs.
5. Suppliers and receivers should provide any changes to their input data through the schedule-control method.
6. Any "slack" belongs to supplier. Slack is the time that a delivery is available before the required date. The supplier can use the slack to delay the product's delivery date (without being tardy) in order to deliver another product earlier.
7. The receiver can delete a low-level internal product without a supplier's approval. The receiver should contact the supplier and let that party know it is being deleted.
8. The receiver initiates the request for a deliverable. A deliverable must be required by a receiver in order to exist.
9. Only the receiver can decide when the when a product's delivery has been completed.

A list of the states and preferred comments for each state used during negotiation (steps 56 and 57) are defined in detail, below:

Reconciled: A product's existence has been agreed to and the planned delivery date supports the required date. The state is counted as fully reconciled. Comments for this state include: Completed, Dates OK, or Early OK.

Date Not Agreed: A product's existence has been agreed to, but the delivery date is not reconciled. Comments for this state include: Scheduled Late, Needs Both Dates, Needs Supplier Date, Needs Receiver Date, Supplier Slipped, or Receiver Needs Earlier.

Product Not Agreed: This is a product wherein the supplier and receiver do not agree on the product's existence. Comments for this state include: No Receivable, No Deliverable, Deleted by Supplier, or Deleted by Receiver.

No Impact: This is a product which both sides have agreed to delete and which remains on the report for one week as a check. The only comment for this state is: Deleted on Next Report. A no impact item is not counted in any statistics for the schedule-control method.

The meanings for each of the comments for the different states are described below:

RECONCILED STATE

| Comment | Meaning |
| --- | --- |
| Early OK | The product is scheduled for early delivery. |
| Dates OK | An agreement has been reached by both the receiver and supplier on the delivery date for the product. |
| completed | The product has been delivered. |

DATE NOT AGREED STATE

| Comment | Meaning |
| --- | --- |
| Needs Both Dates | The product is agreed to, but both receiver's and supplier's dates are missing. |
| Needs Receiver's Date | The product is agreed to, but the receiver's date is missing. |
| Needs Supplier's Date | The product is agreed to, but the supplier's available date is missing. |
| Scheduled Late | The product is agreed to, but is scheduled for delivery after the required date. |
| Supplier Slipped | The product was reconciled. The supplier cannot make the original agreed-to delivery date, and has changed it to a later date. |
| Receiver Needs Earlier | The product was reconciled. The receiver needs the product earlier than the originally agreed-to date, and has changed it to an earlier date. |

PRODUCT NOT AGREED STATE

| Comment | Meaning |
| --- | --- |
| No Deliverable | A receiver has requested a product, but the supplier hasn't identified that product in the deliverable list. |
| No Receivable | A supplier has specified a product in his or her deliverable list, but the receiver hasn't requested that product. |
| Deleted by Receiver | A supplier has specified a product in his or her deliverable list, but the identified receiver doesn't need the product and has marked it for deletion. |
| Deleted by Supplier | A receiver has requested a product, but the identified supplier doesn't manufacture that product and has marked it for deletion. |

NO IMPACT STATE

| Comment | Meaning |
| --- | --- |
| Deleted on Next Report | This product will be deleted from the next report because: 1) both the receiver and supplier have deleted the product; 2) the supplier originally submitted and has now deleted the product, and the receiver has never input data concerning the product; or, 3) the receiver originally submitted and has now deleted the product, and the supplier has never input data concerning the product. |

If an issue concerning the product is left unresolved, the opposing party then responds to the entered comments at step 57. In responding to the comments, the suppliers or receivers preferably take the following actions.

| Comment: | Action: |
| --- | --- |
| No Deliverable | 1. The supplier agrees to deliver the product with the current name to form an agreement.<br>2. The supplier doesn't plan to deliver the product and notifies the receiver that the product is not planned to be delivered.<br>3. The supplier agrees to deliver the product and reconciles a new name for the product with the receiver. |
| No Receivable | 1. The receiver accepts the product with the current name to form an agreement.<br>2. The receiver doesn't need the product and notifies the supplier |

| Comment: | Action: |
|---|---|
| | that the product is not needed.<br>3. The receiver, agrees to accept the product and reconciles a new name for the product with the supplier. |
| Deleted by Receiver | 1. The supplier deletes the product to form an agreement.<br>2. The supplier deletes product and contacts another receiver to accept delivery of the product.<br>3. The supplier contacts the receiver to convince him or her that the product is needed. |
| Deleted by Supplier | 1. The receiver deletes product to form an agreement.<br>2. The receiver deletes the product and contacts another source to deliver the product.<br>3. The receiver contacts the supplier to convince him or her to provide the product. |
| Deleted on Next Report | 1. Do nothing; the product is removed from the database.<br>2. If the user disagrees, he or she must notify the other party.<br>3. If the product still exists but has the wrong supplier or receiver, the product is re-submitted with the correct supplier or receiver. |
| Needs Both Dates | 1. The receiver inputs the required date.<br>2. The supplier inputs the available date. |
| Needs Receiver Date | 1. The receiver inputs the required date. |
| Needs Supplier Date | 1. The supplier inputs the available date. |
| Scheduled Late | 1. The supplier can agree to deliver the product earlier; in this case, the new delivery date should be input.<br>2. The receiver can agree to postpone the required date and inputs a new required date.<br>3. The required date is slightly modified. |
| Early OK | 1. The product is reconciled; no action is required. |
| Dates OK | 1. The product is reconciled; no action is required. |
| Supplier Slipped | 1. The supplier finds a way to deliver the product on the original date.<br>2. The receiver agrees to postpone the required date.<br>3. A meeting is scheduled with the System Manager to resolve the problem. |
| Receiver Needs Earlier | 1. The supplier agrees to deliver the product earlier.<br>2. The receiver finds a way to receive the product on the original date.<br>3. A meeting is scheduled with the System Manager to resolve the problem. |

Dialog between the two parties continues until a resolution is reached at step 54. At this point, work is performed on the product by the supplier at step 58. The supplier and receiver then determine if the product is reconciled as a result of this work (step 59). If the product is completed, input data are supplied to the method stating that the product is reconciled at step 60. If the product is not completed, the appropriate state is input to the method at step 61. This state is updated in real-time.

The state and comments for each task included in the project can be processed by the computational component to determine the status of the project at any particular time (step 62). The status of the project can be sent at any time to each supplier and receiver in the project. The status is preferably sent in the form of a second set of output data at step 63. In this way, the users involved with the project have real-time access to the project's status.

The second set of output data can take any of a number of forms, such as reports, graph and charts, GANTT charts, product listings, or metric reports. The output data can indicate a project history which is maintained by a comparison between the current and previous states of the various products of the project. Output data are preferably sent electronically over the electronic user interface. Alternatively, output data can be printed on paper and distributed to suppliers and receivers.

The suppliers and receivers also generate reports which show all of a project's unreconciled receivables and deliverables. Such reports also identify receivables and deliverables which were previously in agreement, but which have been subsequently broken by the receiver or supplier changing an available or required date. A new product is then reconciled by the other side indicating an agreement and providing an available or required date through the schedule-control method. The suppliers and receivers generate new reports which identify both the remaining unreconciled receivable/deliverable products and broken agreements. The negotiating process repeats itself until all of a supplier's or receiver's products are reconciled.

Reminders can also be sent over the electronic user interface at step 64. The remainders provide a mechanism for suppliers and receivers to complete their particular product or task. In particular, the computational component is programmed to automatically send e-mails through the user interface to the responsible parties. These e-mails serve to update both suppliers and receivers on the status of the product. If there is an issue which needs to be resolved between the responsible parties, the method receives and stores information concerning the issue. The issue can also be supplied via an e-mail to a manager who, in turn, presents a resolution to the issue.

The output data are processed by the suppliers and receivers at step 65 to facilitate completion of each product in the project.

A number of additional steps may be performed before input data are entered into the schedule-control method 22. For example, Technical Managers may provide preprocessing of the product by negotiating a product's status among themselves. If no reconciliation results and the Technical Managers are within the same division, the division representative may become involved in the process. Otherwise, the appropriate System Manager gets involved. Ideally, negotiations continue until agreement is reached. However, input data may be entered into the schedule-control method before this point.

Figure 4:
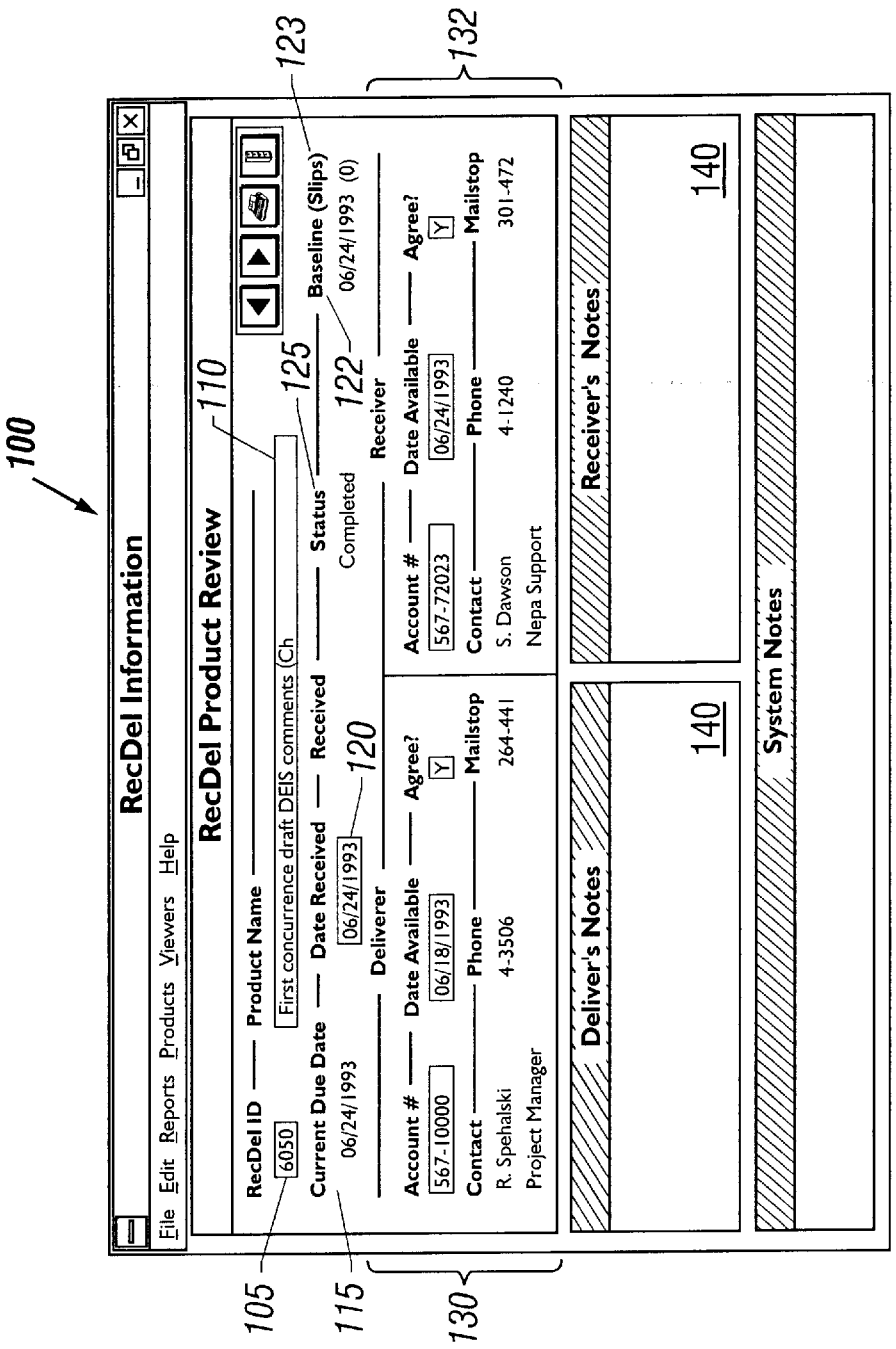
FIG. 4 is a printout of a computer screen used in the schedule-control method to provide input data in the preferred rec/del format.

FIG. 4 shows a printout of a computer screen 100 used with the schedule-control method to provide input data in the preferred rec/del format. Bids containing input data are entered directly into the screen 100 and then sent to the computational component for processing. Data such as the product's rec/del identification number 105, the product name 110, and the product's due date 115 and received date 120 are provided. The computational component processes the due date 115 and received date 120, returning a "baseline" 122. The baseline is the original agreed-to delivery date for the product. A "slip" 123 is indicated when this date is not met. The screen 100 also lists information (e. g., contact names, mailing addresses, and phone numbers) concerning the supplier 130 and receiver 132 of the product.

Both the supplier and receiver of the product provide appropriate input data using the same screen 100. The input data are processed as described above to determine the status 125 of the project, which is then returned to the screen 100. Both the supplier and receiver can also enter comments 140 used, as described above, during negotiation of the product's state.

Project-Management System

Figure 5:
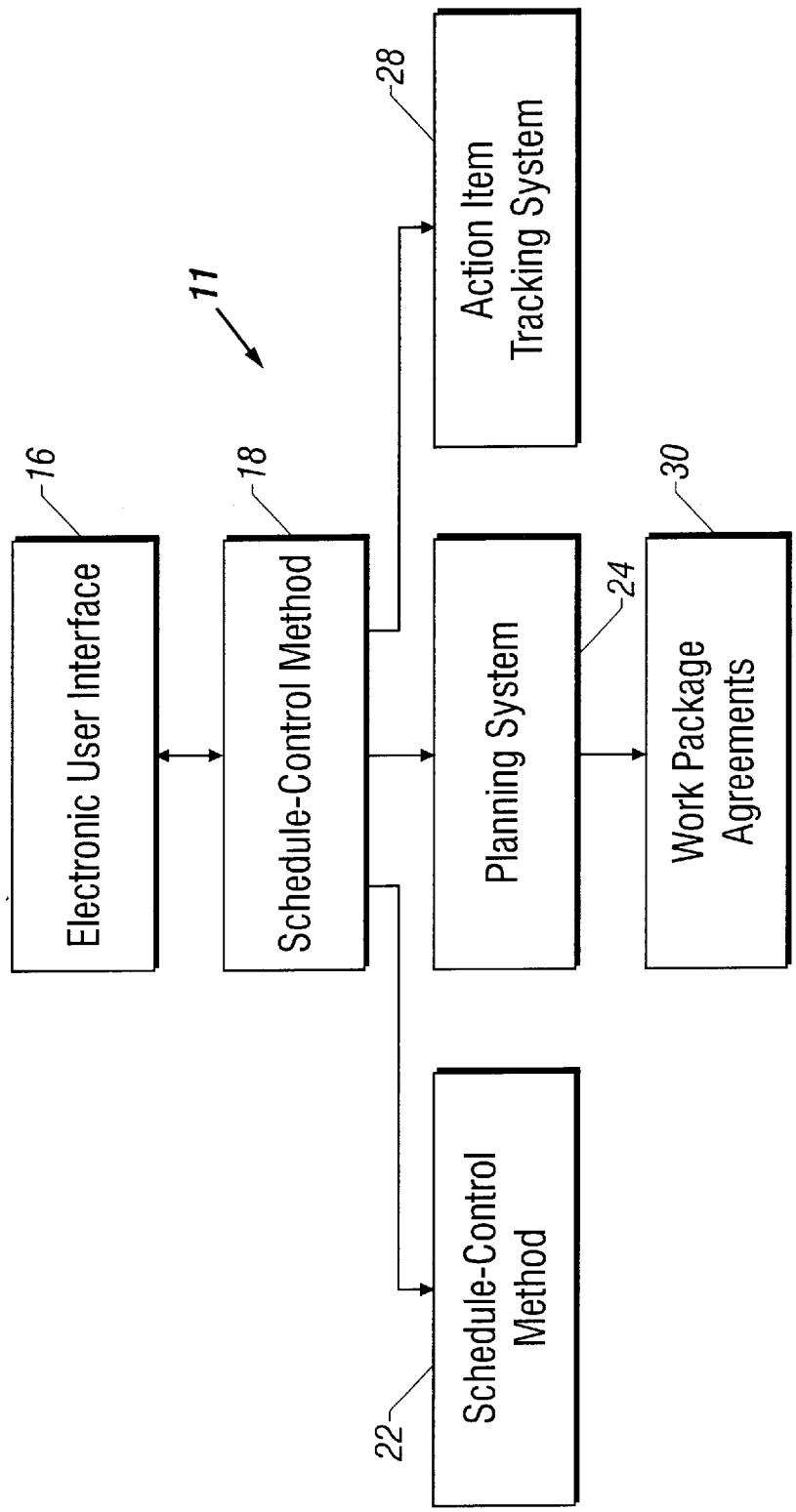
FIG. 5 is a block diagram showing a project-management system using the schedule-control method of the invention.

FIG. 5 shows a block diagram listing the components 11 used to implement the schedule-control method 22. The components 11 include a computational component 20, a schedule-control system database 18, and an electronic user interface 16. In this case, the computational component 20 includes functions for performing the steps of the schedule-control method 22 shown in FIG. 3, along with functions for a planning system 24 and an action item tracking system 28 (AITS). Each of these systems performs a computational function, described below, which acts on a table of input data in the schedule-control method relational database 18.

Users can interactively modify, update, and categorize the state of receivables and deliverables for each product of a particular project using the schedule-control method 22. Input data are entered into the database 18 in the rec/del format using the electronic user interface 16; communication between suppliers and receivers proceeds according to a well-defined set of ground rules. Reconciliation of a product's existence and its required receivable dates and planned deliverable dates is achieved by a series of negotiations between the project's Technical Managers, Division Representatives, and System Managers at the appropriate levels. The state of each product is updated as work is performed on that product.

Figure 6:
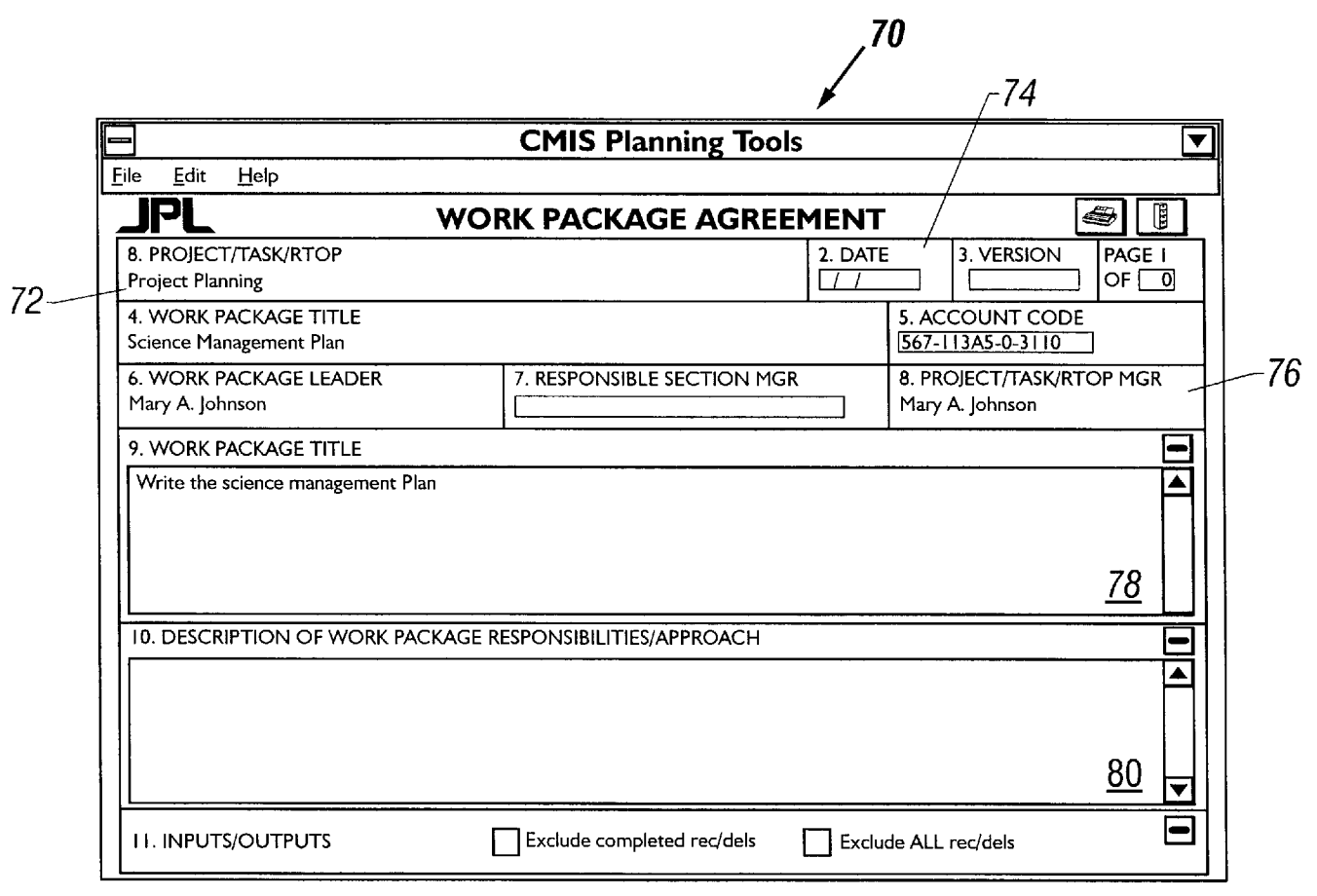

The planning system 24 is used in combination with the schedule-control method 22 to coordinate working agreements between suppliers and receivers. The planning system 24 additionally includes applications for work package agreements 70 (WPAs), an example of which is shown in FIG. 6. This form is completed by all Technical Managers before working on a task. Empowered users create, view, edit, and print WPAs 70 using the WPAs 30 system. Each WPA 70 documents the task by including its title 72, date 74, users who perform the work 76, the objectives of the task 78, and a description of the approach used to work on the task 80. WPAs can also include the task's duration, financial data, items that must be delivered for the work package to proceed, and start and projected completion dates for the activities described in the work package.

Users can initiate, edit, and print reports for action items and requests for action using the AITS system 28. Action items are the result of reviews and other technical meetings. They are items considered important enough to track and close formally. Requests for action are prepared during formal project reviews and are formally accepted, rejected, or adjudicated by the project's management. If the management accepts a request for action, one or more action items may be assigned. Input data for the AITS system includes the action item's or request for action's origin, assignor, date assigned, date completed or date due, and description.

Each of the components included in the computational component of the schedule-control method 22 is preferably programmed into a computer connected and distributed on a LAN. Like the schedule-control method, the systems are designed to access tables of data from the relational database 18.

The systems are preferably coded in programming languages, such as Foxpro™ (manufactured by Microsoft, Corp., One Microsoft Way, Redmond, Wash. 98052-6399) which can easily process data from the relational databases. Most preferably, the systems are coded into personal computers running conventional platforms, such as Windows™ or Apple Macintosh™ platforms. Any conventional relational database software can be used for this application.

The computers running the schedule-control method are preferably connected and distributed on a LAN and interfaced with a printer. Any standard LAN software package, such as the Netware™ package manufactured by Novell, Inc. (122 East 1700 South, Provo, Utah. 84606-6194), can be used to connect the system of computers.

Preferably, the computers include software for running conventional e-mail applications. Any standard e-mail software package, such as the cc:Mail™ package manufactured by Lotus Development Corp. (55 Cambridge Parkway, Cambridge, Mass. 021421-1295), can be used for this application.

The schedule-control system is preferably programmed in a Windows™ or Apple Macintosh™ platform. The schedule-control system is preferably programmed so that each of its features is represented as an icon or a pull-down menu (see, for example, FIGS. 4 and 6). Users can thus "point and click" using an external mouse, thereby simplifying and expediting operation. Input data can be edited using standard "undo", "copy", "cut", and "paste" commands available in commercially available windows-based software.

Application of the Schedule-control Method to the Cassini Project

The schedule-control method, described herein in its preferred embodiment, is used to manage the Cassini project, a space mission to Saturn under development at NASA's Jet Propulsion Laboratory (JPL). The project encompassed more than 1,000 employees and had an annual budget in excess of $200 million. Employees (i.e., suppliers and receivers) involved in the project use the schedule-control method following the guidelines described above. Input data provided by the employees are used to generate a series of graphical output data, such as reconciliation charts and planned versus actual graphs for the project.

Figure 7:
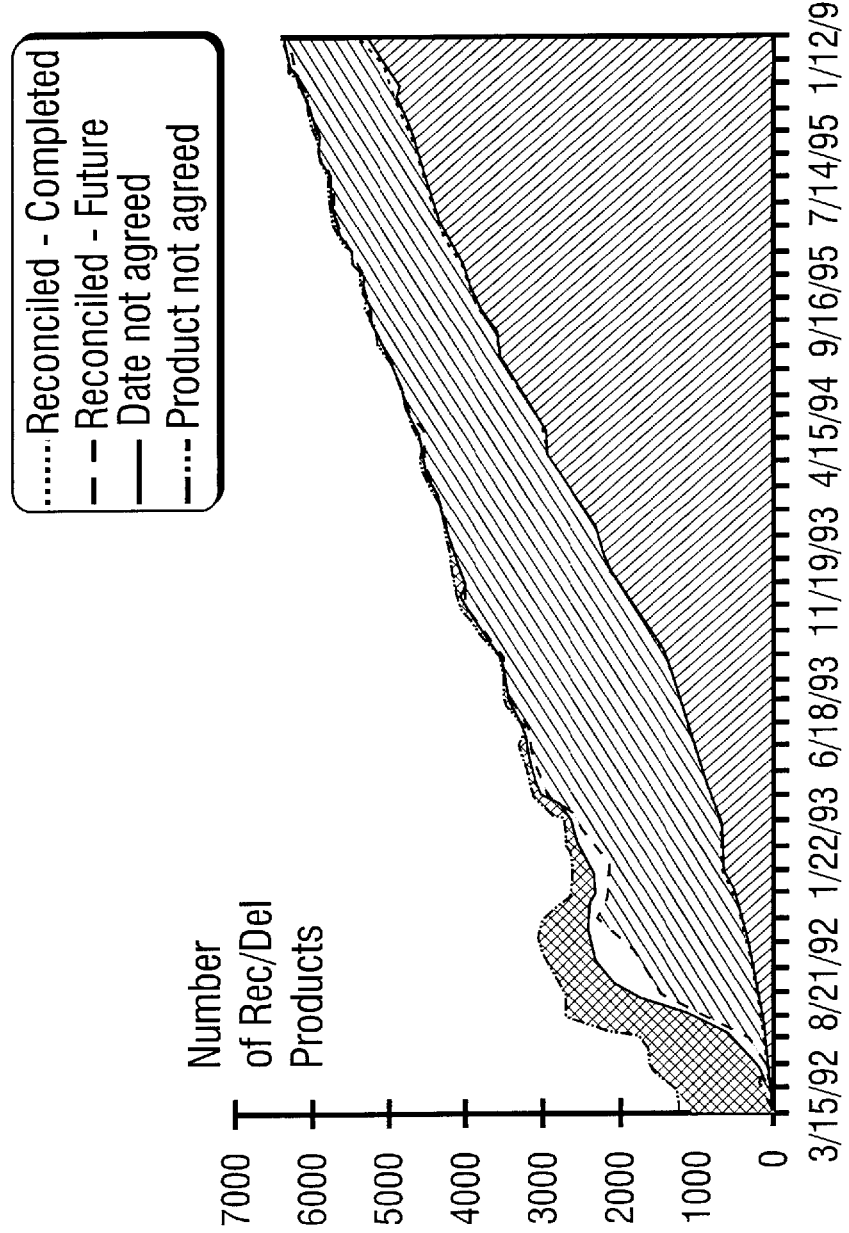
FIG. 7 is a reconciliation chart for a large-scale project showing the status of the products comprised by the project; and, FIG. 8 is a "planned versus actual" graph for the large-scale project of FIG. 7.

FIG. 7 shows a reconciliation chart plotting the status of all receivable and deliverable products for the project as a function of time. The plot is generated in response to input data provided by individual suppliers and receivers for the project. The output data in the plot are broken down into four categories using the schedule-control system. The definitions of the states are entitled "reconciled", "date not agreed", and "product not agreed", and the "broken agreements" according to the categories given above. Typically, a reconciliation plot such as that shown in FIG. 7 will be distributed on a monthly basis to the Project Managers, Division Representatives, and System Managers of the Cassini project. Inspection of the plot by these personnel is used to determine the status of the project.

The number of unresolved products in the project (i.e., those having the "date not agreed", "broken agreement", or "product not agreed" status) was relatively high in the beginning stages. One year later, these unresolved products were nearly eliminated. In fact, since implementation of the schedule-control system, 99.9% of the project's delivery plans have been reconciled.

Figure 8:
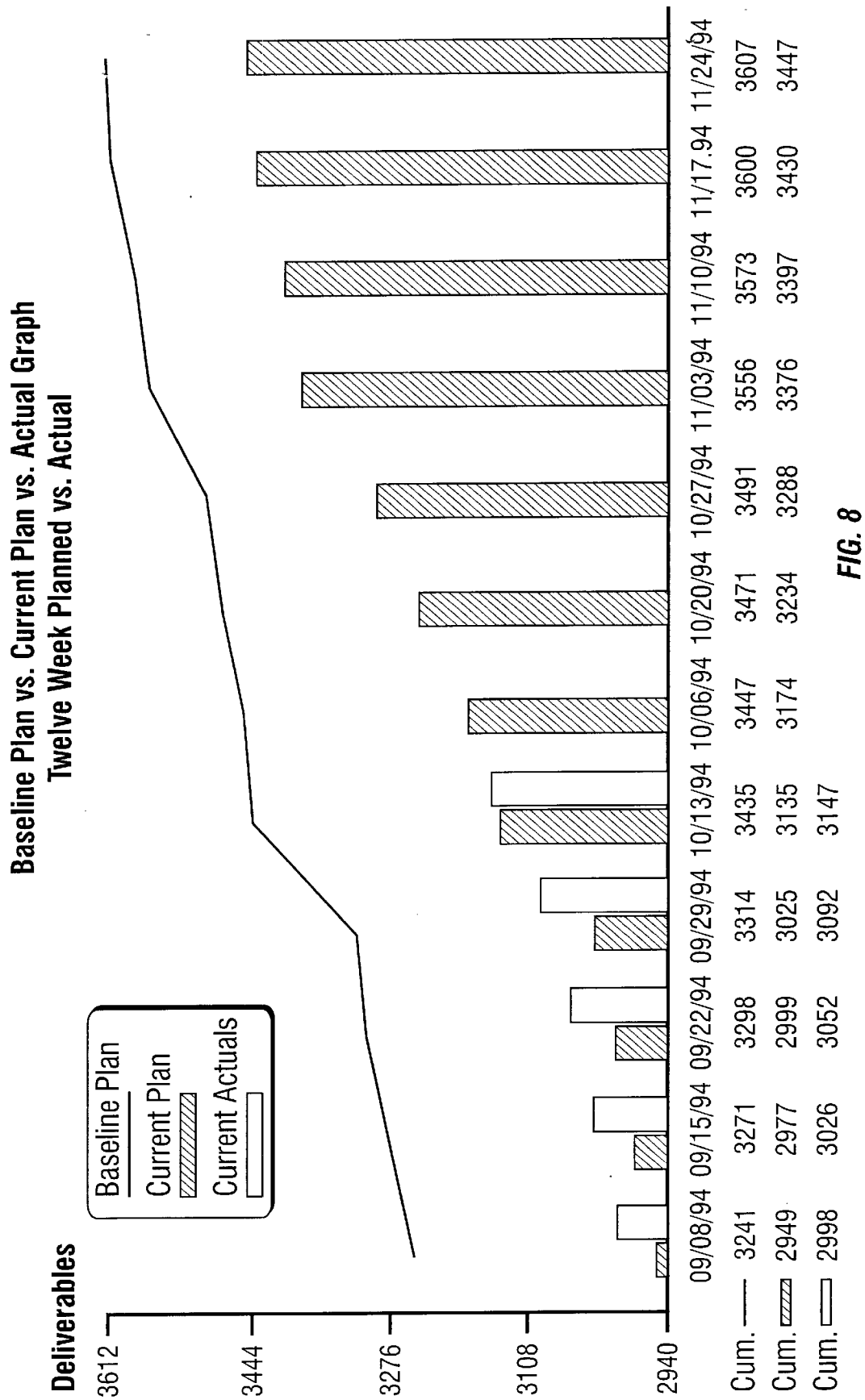

FIG. 8 shows a "planned versus actual" graph plotting the status of a series of products over a twelve-week period of the Cassini project. The light bars in the graph represent the "current plan" as determined by the input data from various suppliers and receivers using the rec/del format. The current plan is the most recent agreed-to delivery date for the products in the project. The total number of counts for these bars represents the cumulative number of products scheduled to be finished by the status date according to the current plan. The dark bars represent the actual completed products as determined from the input data. Here, the total number of counts represents the cumulative number of rec/del products that were actually finished on or before the status date listed on the horizontal axis. These values can be compared to a cumulative "baseline plan" which is the original agreed-to delivery date for the products. These data, in turn, can be processed to facilitate successful completion of the project. For example, steeply sloped curves in the data typically indicate unrealistic plans or critical products being delivered to many different receivers.

Data from the graph was generated by the computational component of the schedule-control system using input data provided by the suppliers and receivers involved in the project. The period over which the planned versus actual status of the project is calculated can be adjusted. Typically, graphs similar to that shown in FIG. 8 covered adjustable periods ranging from 12 weeks to 1 year. As is evident from the data, all parties involved can determine the cumulative status of the project as a function of time.

Other embodiments are within the scope of the invention. For example, this system has been described as being carried out in software. It can be alternately carried out using hardware techniques where dedicated modules are used to carry out each function that has been described above. Likewise, any step described above can be replaced with one or more steps, or can be removed, to perform the schedule-control method. Alternate steps can be used to form contracts for each task and monitor the status of each product in the project. Similarly, the state, status, and comments for each product can be different from those described above.

Still other embodiments are within the scope of the following claims.

What is claimed is:

1. A method for schedule-control planning of a project separated into multiple tasks, each of which generates an independent product supplied by a supplier and received by a receiver, said method executed in a computer system, said method comprising:

receiving a first set of input data for a task generated in the project from either a supplier or a receiver using an electronic user interface;

storing the first set of input data in a database;

analyzing the first set of input data for the task stored in the database with a computational component to generate a contract and a state for a product associated with the task; and, processing the state of the product to facilitate planning of the project.

2. The method of claim 1, wherein said processing further includes negotiating the state of the product.

3. The method of claim 2, wherein said negotiating includes:

sending a first set of output data over the electronic user interface to the supplier, receiver, or supplier and receiver for the task; and receiving a second set of input data in response to the first set of output data from either the supplier, receiver, or supplier and receiver for the task.

4. The method of claim 3, wherein said negotiating further includes repeating said sending and receiving until an agreement between the supplier and receiver is reached.

5. The method of claim 3, wherein the database is a relational database and the state of the product is updated during said negotiating by sending the updated state over the user interface and to the relational database.

6. The method of claim 1, wherein said processing further includes updating the state of at least one product after performing work on the product by sending the updated state over the user interface and to the database.

7. The method of claim 1, wherein the task is a first task, the method further comprises:

separating the project into multiple tasks, including the first task, associated with multiple products supplied by the supplier and received by the receiver; and computing each state for each product to determine a status of the project.

8. The method of claim 7, wherein said processing of each state includes summing together each of the states.

9. The method of claim 7, wherein after said computing, said method further includes sending over the electronic user interface to the supplier, receiver, or supplier and receiver of each task a chart, plot, graph, or report describing a status of the project.

10. The method of claim 9, wherein the supplier, receiver, or supplier and receiver of at least one task sends further input data over the electronic user interface in response to the chart, plot, graph, or report.

11. The method of claim 1, wherein the input data for the task provided through the user interface includes:

a name for the product;

a receiver's required delivery date for the product; and, a supplier's available delivery date for the product.

12. The method of claim 11, wherein said processing further includes determining from the input data whether or not the supplier can supply the receiver with the product by the receiver's required delivery date.

13. The method of claim 12, wherein the state assigned to the product include a status of "reconciled, "date not agreed", "product not agreed", or "no impact".

14. The method of claim 1, wherein said receiving, processing, and analyzing are performed on a networked computer.

15. The method of claim 14, wherein the project comprises a plurality of tasks and wherein a computer is assigned to each supplier and receiver in the project.

16. The method of claim 15, wherein each computer is connected to one another and distributed over a local-area network.

17. The method of claim 1, wherein the electronic user interface is electronic mail.

18. The method of claim 1, wherein said processing is performed with computer code operating on a relational database.

19. The method of claim 18, wherein the computer code is written in the Foxpro™ programming language.

20. A software program for a project-managing system to control planning of a project that is separated into multiple tasks, comprising instructions for causing a computer to:

provide an electronic user interface so that a first set of input data for each task can be delivered by either a supplier or receiver;

receive the first set of input data for each task from either the supplier or receivers using the user interface;

store the first set of input data in a relational database;

analyze the input data for each task stored in the relational database with a computational component to generate a contract and an initial state for products provided by the project; and, process the state of at least one of the products to facilitate planning of the project.

* * * * *